US009715582B2

United States Patent
Golnabi

(10) Patent No.: US 9,715,582 B2
(45) Date of Patent: Jul. 25, 2017

(54) PREFERENCE-BASED MANAGEMENT INTERFACE FOR USE OF PORTABLE DEVICE APPLICATIONS AND ASSOCIATED METHOD OF USE THEREOF

(71) Applicant: Saeed Golnabi, Ridgewood, NJ (US)

(72) Inventor: Saeed Golnabi, Ridgewood, NJ (US)

( * ) Notice: Subject to any disclaimer, the term of this patent is extended or adjusted under 35 U.S.C. 154(b) by 0 days.

(21) Appl. No.: 14/280,303

(22) Filed: May 16, 2014

(65) Prior Publication Data
US 2015/0332061 A1    Nov. 19, 2015

(51) Int. Cl.
*G06F 7/04* (2006.01)
*G06F 21/10* (2013.01)
*G06F 21/62* (2013.01)

(52) U.S. Cl.
CPC ............ *G06F 21/10* (2013.01); *G06F 21/629* (2013.01)

(58) Field of Classification Search
CPC ......... G06F 21/62; G06F 21/629; G06F 21/10
See application file for complete search history.

(56) References Cited

U.S. PATENT DOCUMENTS

| | | | |
|---|---|---|---|
| 2012/0331516 A1* | 12/2012 | Perez Martinez et al. | 726/1 |
| 2014/0207950 A1* | 7/2014 | Badiee | H04L 43/08 709/224 |
| 2014/0343700 A1* | 11/2014 | Soohoo | 700/91 |

* cited by examiner

*Primary Examiner* — Farid Homayounmehr
*Assistant Examiner* — Suman Debnath
(74) *Attorney, Agent, or Firm* — Vedder Price P.C.

(57) ABSTRACT

A preference-based management interface for use on a portable electronic device, such as a wireless phone, a tablet, or any other device, and the associated method of use thereof, and more specifically the invention relates to a parental credit-based software interface that manages a child's cell phone or portable tablet applications using a credit-based system to allow a child to accumulate play time of favorite applications by accumulating credited time by using applications a parent has set up in the interface to promote use by the child.

15 Claims, 4 Drawing Sheets

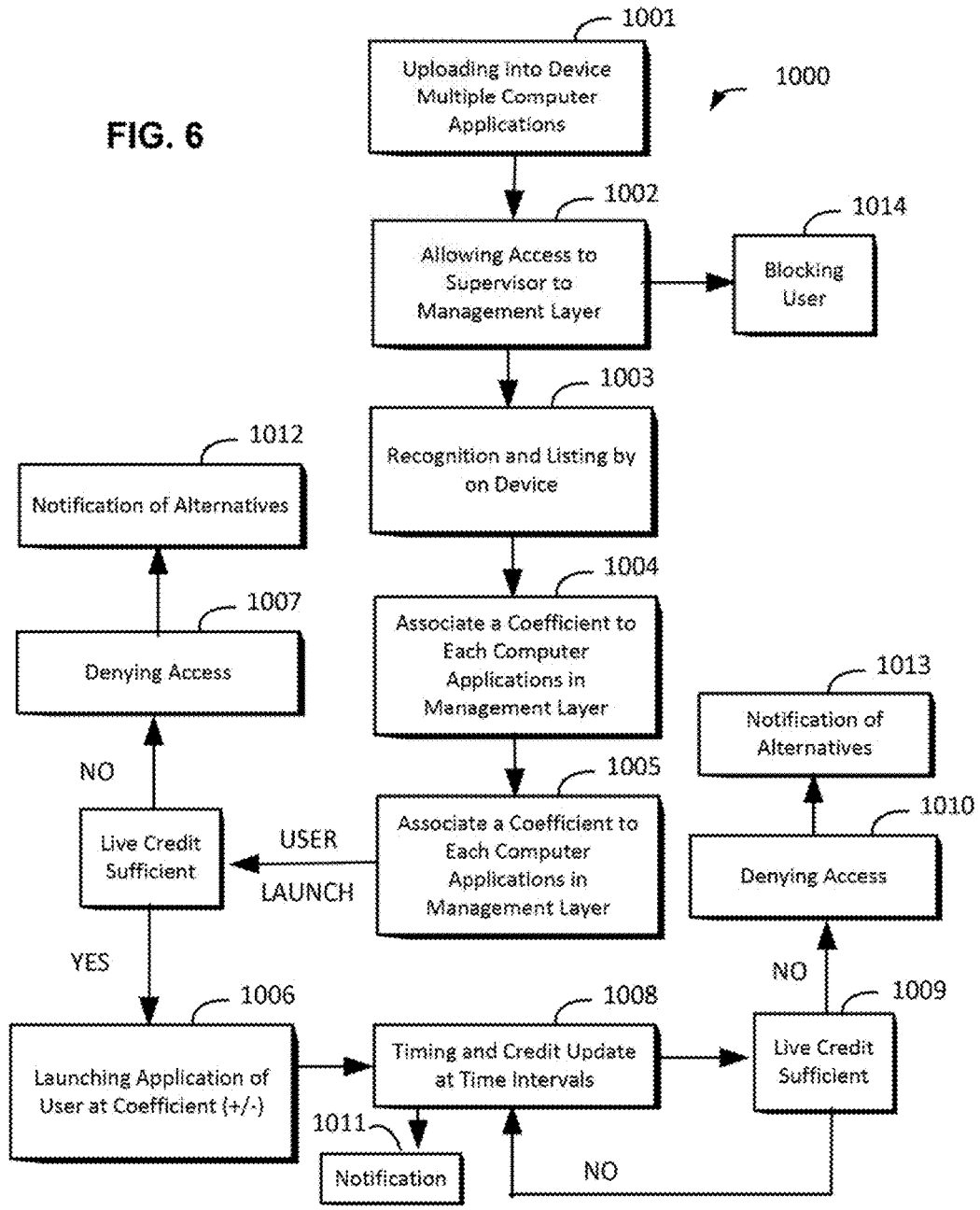

PREFERENCE-BASED MANAGEMENT INTERFACE FOR USE OF PORTABLE DEVICE APPLICATIONS AND ASSOCIATED METHOD OF USE THEREOF

FIELD OF THE INVENTION

The present invention relates to a preference-based management interface for use on a portable electronic device, such as a wireless phone, a tablet, or any other device, and the associated method of use thereof, and more specifically the invention relates to a parental credit-based software interface that manages a child's cell phone or portable tablet applications using a credit-based system to allow a child to accumulate play time of favorite applications by accumulating credited time by using applications a parent has set up in the interface to promote use by the child.

BACKGROUND

There are undeniable advantages in allowing children to own and use one or more portable computer devices, such as a tablet, a web-enabled wireless cell phone, or any other such computer assisted device. These devices may be equipped with GPS tracking systems, which allows parents to know the geographical location of the device, and by association with its holder, the location of owner (child).

These multiple types of devices often include tools to communicate remotely via voice and/or image over different types of wireless networks, HTML format networks, or other known systems. The devices allow a child/user to communicate with a remote user/parent in cases of need. One other advantage of these devices is their obvious instructional and educational value. Parents and teachers may both be given access to multiple types of applications and software that can serve to develop a child and allow homework to be a less tedious task.

One of the downsides to the portability of these devices (aside from their fragility) is the capacity of children, away from parental control, to misuse the devices and use them for entertainment and recreational purposes. For example, as a teacher allows students in class to use a portable device, some users can play games, thwarting the intended purpose of the educator and creating an additional burden on the keeper. The use of systems and methods to help parents, teachers, educators, or any adult control and monitor the use of the communication device of a child, a protégé, or even a team member is of great importance. As is generally the case with educational tools, the careful mastering of tools, if done in a nonobvious way, can result in an important improvement to society.

U.S. application Ser. No. 11/959,761 entitled Content Viewing as an Incentive for Educational Activities, published as U.S. Publication No. US 2009/0165033, on Jun. 25, 2009 teaches a system and method of limiting television viewing of a child while using such limited television viewing privileges as a conditional incentive to encourage television viewers to engage in educational activities. This application teaches a way to halt the viewing of normal network or cable programming watched by a child. The system will then interrupt the normal stream and insert educational content and require a child to enter either orally or via some hand held keyboard answers to questions. This system requires educational content to be available, and requires the use of this content as the basis for returning to ordinary television programming. While useful, this technology is limited in that interruption of the primary content at random moments is extremely unpleasant and can be a source of frustration for a child, transforming the watching of television into a painful learning experience.

Two years after the publication of this first reference from the prior art, International Patent Application No. PCT/AU2010/000293, entitled Method and System for Managing Recreational Use of Personal Electronic Devices, was published Mar. 3, 2011. This reference describes a wireless device system called EducateMe. EducateMe is a remote way for a user to sever the link between a video game and a remote system until a user performs a task of merit or receives tokens from the system administrator. The system is only a large, remote switch which once again uses video game playing privileges as a painful leverage to force a child into performing desired tasks.

Finally, FIG. 1 shows one of the illustrations of U.S. patent application Ser. No. 13/246,892, entitled Broker-Based Management of Mobile Devices, which was published as U.S. Publication No. US 2013/0080522, from the prior art. This third prior art reference describes a remote system on a webserver connected routinely via wireless systems and networks to the portable device, which contains multiple Apps. The remote system allows at routine intervals the uploading of usage data to monitor use and track information. The system provides bulk data as to usage of the different Apps in the list. FIG. 1 shows one embodiment of this prior art disclosure. A parent can ask for a child's phone at night, look at the data and police his child.

Problems with each of these solutions are multifold. Each requires tracking technology, the processing of large volumes of data, and a two-tier layer system residing both on the child's device and the parent's remote computer. Furthermore, each of these three tools only increases the burden on a child already faced with performing in the educational system and trying to escape parental supervision and authority for entertainment purposes. Most importantly, all of these solutions are rather black-and-white in their approach of forcing an ingenious child to find technical ways to bypass the system or not to use his system.

What is needed is a system located on the wireless or portable device of a user, such as a child, which is designed to encourage the focus toward educational or desired software applications, without creating what is felt by the user as an extension of the educational system in a private area, but instead implements a healthy reward system that encourages use, performance and compliance. What is also needed is a simple single-tier system.

SUMMARY

The present invention relates to a preference-based management interface, such as an App format software application that layers above all other software applications, including other Apps on a portable electronic device, such as a wireless phone, a tablet or any other device. The interface, which may be password protected by a parent, includes a portion to allocate to every software application with a coefficient of use value ranging from a positive value to a negative value; for example, in the best mode contemplated, a value can be given between +10 to a −10. Using an overall time-sensitive value, as the user executes and runs any software application, the overall value will be incremented or decreased by the coefficient for each period of time. To encourage use of certain software applications, positive values are given to said applications, which in turn generate credits when used to be spent while using other software applications with negative coefficients.

BRIEF DESCRIPTION OF THE DRAWINGS

Certain embodiments are shown in the drawings. However, it is understood that the present disclosure is not limited to the arrangements and instrumentality shown in the attached drawings.

FIG. 6 illustrates the different steps associated with the operation within the venue of the music sharing system, according to an embodiment of the present disclosure.

DETAILED DESCRIPTION

Figure 1:
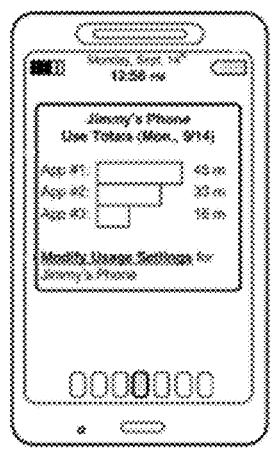
FIG. 1 is an illustration of one of the prior art systems.

For the purposes of promoting and understanding the principles disclosed herein, reference is now made to the preferred embodiments illustrated in the drawings, and specific language is used to describe the same. It is nevertheless understood that no limitation of the scope of the invention is hereby intended. Such alterations and further modifications in the illustrated devices and such further applications of the principles disclosed and illustrated herein are contemplated as would normally occur to one skilled in the art to which this disclosure relates.

While the invention as described herein is primarily explained using one of the contemplated embodiments, namely the use on portable wireless cell phones, using an App uploaded and layered between the operating system of the phone and the multiple software applications on the phone, one of ordinary skill in the art of software will recognize that the same logic and creative inventive steps can be extrapolated and used to improve other types of systems in smaller or larger scales. For example, a high school may implement a system to offer teachers and students data storage, e-mail services, and social networking tools. Such a school-based system could be designed to control bullying and regulate data exchange between students. The invention described herein, while shown on a cell phone of a student, could equally be used on the high school-implemented system. Furthermore, the same system may be implemented on a music listening device of a child for a parent to control the type of songs to which a child is listening.

Figure 2:
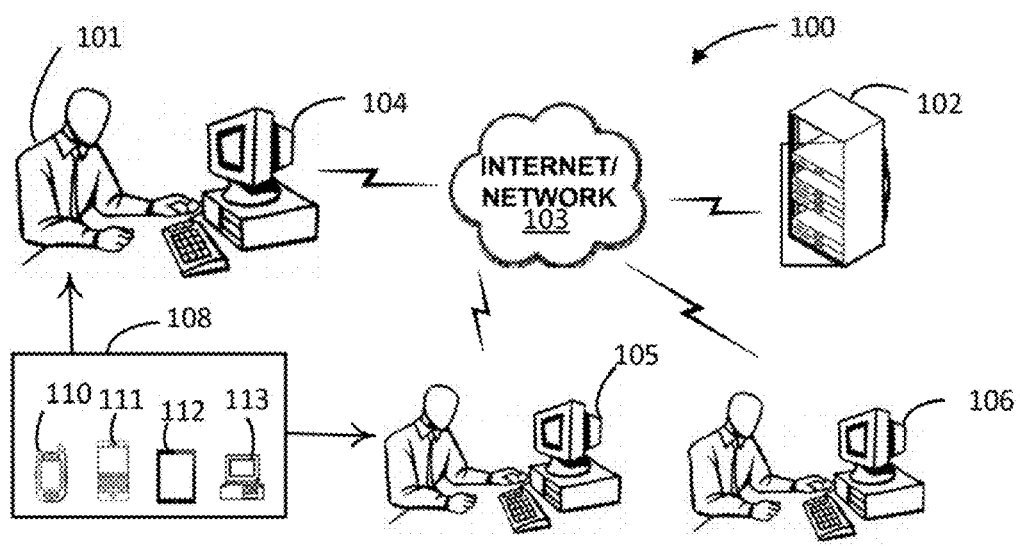
FIG. 2 is an illustration of a network-enabled or non-network-enabled hardware system where the preference-based system and method associated thereto can be implemented, according to an embodiment of the present disclosure.
Figure 3:
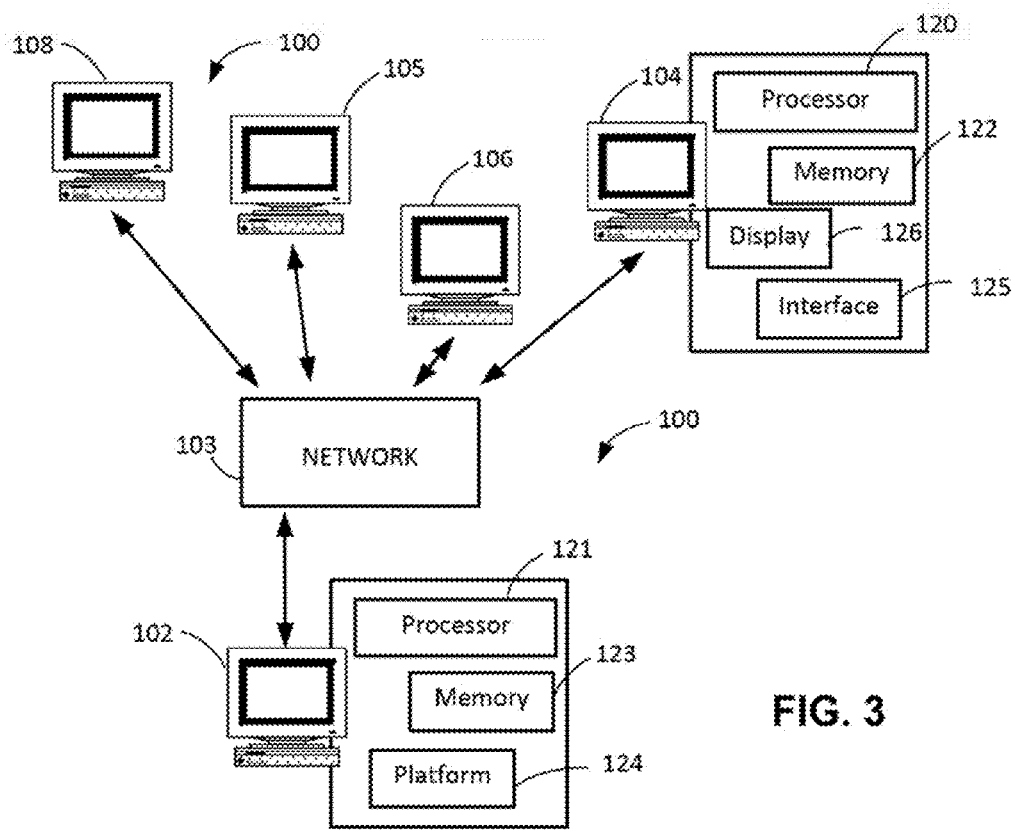
FIG. 3 is an illustration of the different subcomponents that are part of the different pieces of hardware of the system as shown at FIG. 2, according to an embodiment of the present disclosure.

Generally, software operates as a set of instructions running in executable memory of one or multiple processors residing on a computer of some type. With time, these computers have been miniaturized and include portable devices of all types. These computers also have been integrated as part of many products and goods sold in commerce. To fully enable the software and its functions described hereafter, the current disclosure begins with a general summary of how computers are currently used alone or in a network configuration. FIGS. 2 and 3 illustrate a high-distance hardware view of one system, and a closer view of the different basic components within some of the pieces of hardware.

As written, arbitrary numbers are used illustratively in conjunction with the attached set of figures to help with comprehension. The written portion of this specification normally includes all of the concepts shown in the figures to further aid comprehension. In the event of a conflict in interpretation between the drawings and the written description in this patent application, the broadest reasonable interpretation to one of ordinary skill in the art shall prevail.

In these two figures, one possible hardware configuration 100 is shown with icons where a system can be implemented on one or more computers 104, 105, and 106, used by different users 101 illustrated as persons. These computers 104, 105 and 106 are connected over a network like a LAN or the Internet 103 whether physically or wirelessly, using any component of a known technology. For example, over time new standards of wireless communication like Blu-etooth® and its profiles are used to connect different devices inclusive herein as part of the network concept 103.

The software may be either local or operating from a remote server 102 such as a web server over the Internet. Further, with the rapid growth of internet technology and portable wireless technology, what is contemplated is the use of smartphones 110, handheld devices 111, different portable tablets 112, or a computer 113 in addition or instead of the different computers listed above. In one preferred embodiment, the device is simply a cell phone or any other portable device 110, 111, 112 or 113 on which the invention is implemented. As shown in this figure, the network 103, and the remove server 102, may be used, for example, to house in an App repository the invention as a stand-alone software in App format or any other format that can be uploaded directly by a user through an online portal from the portable device 110, 111, 112 or 113. With time, the use of remote cloud memory storage or remote storage or data banks, used in association with remote servers is become more well-known and their use is more widely spread. What is contemplated is the technology described below in association with any type of hardware and software.

FIG. 3, much like the previous figure, shows relatively the same type of hardware organized in a sample network configuration but offers a look into the internals of the server 102 or a computer 104 connected to the network 103. While every computer is different, at the heart of these technologies are processors 120, 121 (i.e., calculators) capable of managing large series of calculations connected to some type of buffering permanent or temporary memories 122, 123 where room is given to data using a program running in the processor to execute functions of many types. The memory 122, 123 may also include long-term memory, short-term memory or access-only memory.

FIG. 3 shows some computers or devices 108, 105, 106, 104, 102, such as, for example, a web server 102 that, where the system 100 resides in part or fully, may house a software platform 124, or use a platform 124 from the server 102. Currently, many software programs will use a local HTML browser software installed on the computers, and their associated displays and interfaces; for example, tablets, cell phones, portable or fixed computers with a commercial browser tool such as Internet Explorer® or Mozilla® to exchange information in the form mostly of HTML script and data linked with the HTML script and display based on the format of the browser locally. The platform software 124, while programmed in any of multiple programming languages, relying on any of multiple database tools, may be made to read and generate content that may be accessed by the remote HTML browsers. Devices 104 as shown may include a user interface 125 and a display 126. In one preferred embodiment, the different devices 104 are portable cell phones, the display is a screen, and the interface is a touch screen capable of interfacing with the operating system and the different software applications residing on the phone.

Different devices, as shown at FIGS. 2 and 3, allow users to upload in one of many ways, for example from an application store, one of millions of computer applications that can operate in the device of the user. Some of the computer applications are educational in nature; others are not. For example, users may have a social media application, a text application, a picture editing application, etc. The uploading and removal of these software applications is made fluid over time by the ease in access to these computer software databases.

Figure 4:
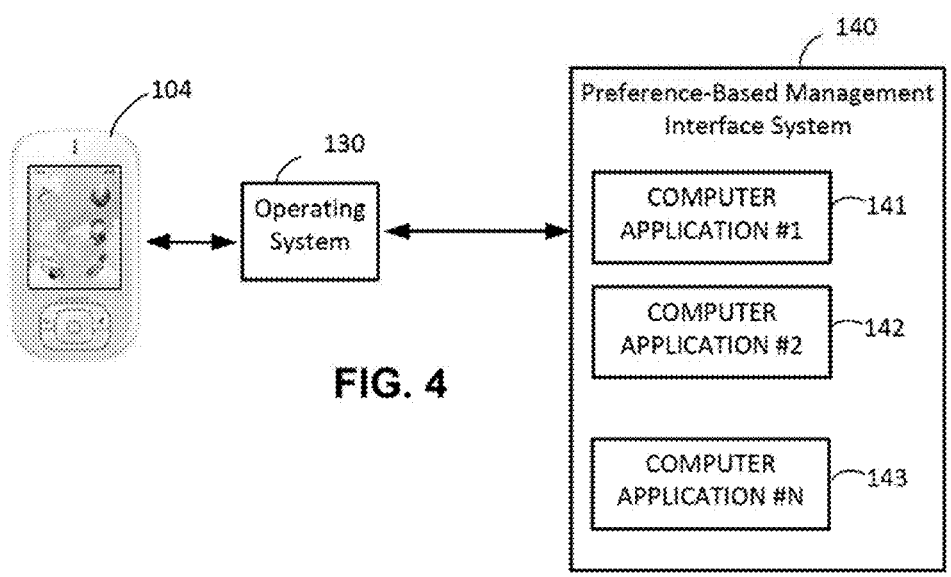
FIG. 4 is an illustration of the interplay between the preference-based management interface system and the different computer applications it manages according to an embodiment of the present disclosure.

As shown generally at FIG. 4, the current invention is a software layer 140, named illustratively the preference-based management interface system, that positions itself between the operating system 130 of the device 104, and each of the software applications 141, 142 and 143, present or installed on the device 104. The invention acts as a guardian or a gatekeeper allowing the user what can appear like a normal access to each software applications, but in fact the interface system 140 is the one that manages which software application is entitled to execute and has a function to monitor all of the usage.

Figure 5:
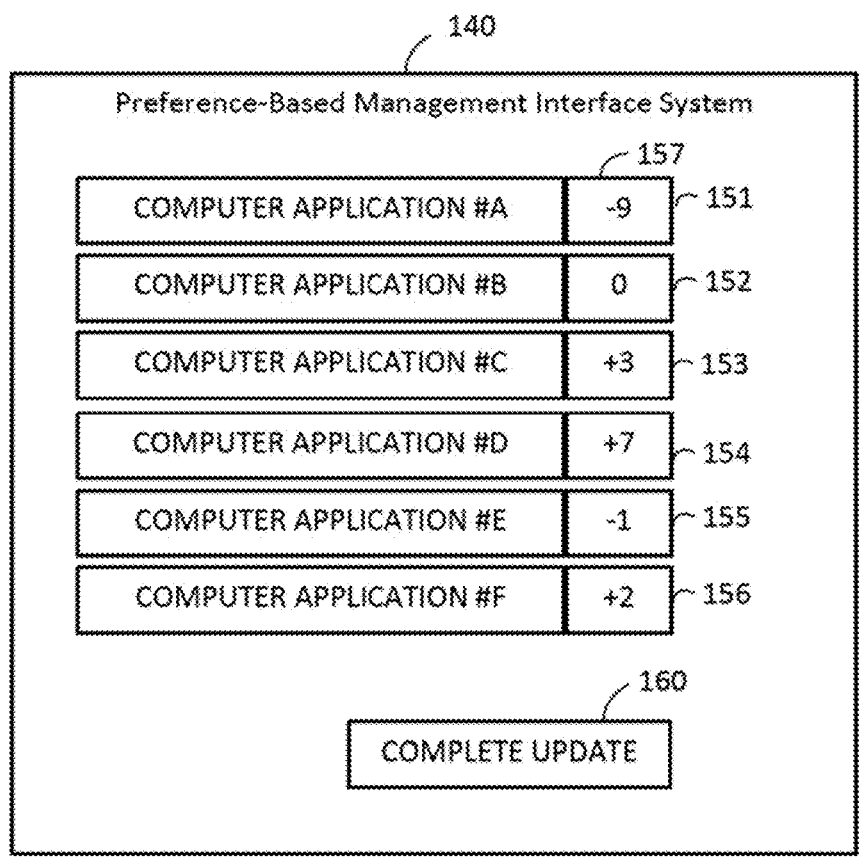
FIG. 5 is an illustration of the different computer applications and their associated credit or debit generation coefficients, according to an embodiment of the present disclosure.

FIG. 5 shows with greater detail how the software layer 140 may be accessed via the password-protected parental guidance portion and will create a list of all software and computer applications listed as A, B, C, D, E and F; in this example, 151, 152, 153, 154, 155 and 155 respectively. With the patent, once the interface 140 has listed all of the computer applications 151 to 156, the system user is then allowed to assign a coefficient 157. The selection process may be made by the user using multiple different simplified tools; for example, using a finger, the user may slide to the left to increase the number and slide to the right to decrease the number. In another contemplated embodiment, colors may be used to indicate in addition to the value if the value is a credit (in green) or a debit (in red). In the example given at FIG. 5, the computer application #A 151 has a debit value of −9, while computer application #B 152 has a zero value, and computer application #D 154 has a credit value of +7.

In one embodiment, the values represent minutes of use. The use of computer application #B with a setting of zero is always possible; the interface 140 will not prevent the use irrespective of the credit value of the user; and the use of the application does not grant the user any credit or debit as time goes. Computer application #A 151 with a negative value of −9 requires 9 points from a user's total credit value to be launched and played for a minute. For example, a user with a total value of credit of 90 may play 10 minutes before the interface 140 will switch off the application. Applying the same logic, computer application #D 154 has a credit value of +7 and a user will be credited seven points to the user's total credit value for each increment of time, in one preferred embodiment a minute. A user who wishes to play five minutes of computer application #A would need 45 credits and could decide to open computer application #D and use it for seven minutes to get a total credit of 49 credits.

The logic behind this system is very mature and respectful of the user. As shown, a parent assigns values and does not need to block any single computer application. By assigning a very high negative value (here −10), the child will be discouraged from using the application but more importantly does not feel like the parent is prohibiting altogether the use. By browsing the different applications and selecting judiciously which positive credit application to launch, a user may optimize the experience. For example, FIG. 5 shows computer application #C 153 having a credit of +3, unlike computer application #D 154, which has a credit value of +7. If a user does not like the computer application #D 154 (for example a homework application) but instead prefers an educational application #C 153 (for example the Discovery Channel®), the user may prefer taking a total of 15 minutes to accumulate 45 points to be able to then play the computer application #A 151 for five minutes.

What is contemplated is a system and associated method of use that creates a very easy to program preference-based list for a parent on a child's cell phone, which in turn allows the child to decide which is the path preferred to generate the credits.

The interface 140, which may be password protected by a parent, includes a portion to allocate to every software application with a coefficient of use value ranging from a positive value to a negative value, for example, in a best mode contemplated, a value can be given between +10 to a −10. The interface 140 is also equipped with protections to prevent a child or a user from circumventing the timing function of the interface 140 by changing the device's internal clock. One way is simply to generate and update the credit value based a live update of time instead of relying on the internal clock of the device. Another simple way is to allow the interface to rely on its own internal clock. One of ordinary skill in the art will know the different ways and systems associated with the protection of access of the parental setup portion, and the capacity to bypass the interface layer 140 by rebooting or by launching secondary software that interferes with the interface 140.

What is contemplated is a preference-based management interface system as shown at FIG. 2, comprising a portable device 108 in possession of a user 101 having at least a computer processing unit (CPU) 120 as shown at FIG. 3 for executing in a memory 122 connected to the CPU 120 a plurality of computer applications 141, 142 and 143 as shown at FIG. 4 operating in a computer operating system environment 130. The system 108 also includes a display 126 connected to the CPU 120 for displaying at least one of the plurality of computer applications 141, 142 and 143, and a user interface 125 connected to the CPU 120 for interaction with the at least one of the plurality of computer applications 141, 142 and 143 being displayed on the display 126. The system also includes a management application software layer 140 operating within the CPU 120, and a plurality of computer applications 141, 142 and 143 for individual consecutive execution in the CPU 120 for use by the user 101 of the portable device 108 using the display 126 and the user interface 125.

The management application software layer 140 allows or denies access by the user to a requested computer application 141, 142 or 143 from the plurality of computer applications 141, 142 and 143. For example, the layer 140 can either permanently or at regular intervals provide a user a warning or a notice every time increment or upon failure to launch. For example, notices like "You have only 2 credits, you cannot launch this application, please try playing _____ instead for a while." A large number of different notices are contemplated, including providing a simple-to-understand counter with the number of credits and showing to the user when these credits change every time increment.

In one embodiment, the allowance of access or the denial of access of the user to any requested computer application 141, 142 or 143 is based on a credit system with a live credit value personal to the user wishing to launch or use the requested computer application as described above. The management application software layer 140 as shown at FIG. 5 can allow a supervisor or a parent to associate a credit generation coefficient 157 (if positive) or a credit depletion coefficient 157 (if negative) to each of the plurality of computer applications 151, 152, 153, 154, 155 or 155.

In one example, the management application software layer 140 at fixed time intervals for example, a minute, incrementally updates the live credit value (not shown) of the user based on either the credit generation coefficient or the credit depletion coefficient 157. For example, at time A, a child has a credit value of 93 credits and plays with computer application #D 154. The next minute, the credit value will be changed to 100 credits.

The portable device 108 can be selected from a group consisting of a tablet 112, a wireless phone 111, a web-enabled hand held device 110, or a portable computer 113. The management application software layer 140 can be an 'App' type software uploaded via a network from an App store or any other store, and wherein at least one of the plurality of computer applications is an App uploaded by the user via the network from an App store. As explained above, color is used by the management software layer 140 to help the supervisor to distinguish between a computer application given a credit generation coefficient and a computer application given a credit depletion coefficient 157 by using either red or green, for example.

As shown at FIG. 5, the supervisor association of the credit generation coefficient or the credit depletion coefficient 157 to each of the plurality of computer applications 151 to 156 is made by first accessing a list of computer applications as shown and either not touching on the computer interface to keep the value at a default initial zero, swiping in a first direction to increment the credit generation coefficient positively, or swiping in a second direction to increment the credit depletion coefficient. In one embodiment, a user can update or reset the different coefficients 160.

Equally as important as the system and software that is designed to enable this invention is a series of novel methods of allowing a supervisor of a preference-based management interface system as described above to motivate a user, such as a child, of multiple computer applications toward a greater use of some of the computer applications. FIG. 6 illustrates in part these methods 1000. These methods as shown include the steps of allowing a user to upload into a portable device a plurality of computer applications 1001, allowing 1002 a supervisor to access the management application software layer on the portable device, and to recognize 1003 and list all of the computer applications in the device. Next, as shown at FIG. 6, the method includes the step of allowing the supervisor to associate a credit generation coefficient or a credit depletion coefficient to each of the plurality of computer applications 1004, and then setting 1005 an initial value for the live credit value personal to the use.

Once these different coefficients are entered as shown at FIG. 5, the method includes the repetition of steps of either allowing the user to launch 1006 a selected computer application having a credit generation coefficient and incrementing at a fixed time interval 1008 the live credit personal value of the user based on the credit generation coefficient, or denying 1007 the user to launch the selected computer application having a credit depletion coefficient if the live credit personal value of the user is lower than the computer application credit depletion coefficient value set by the supervisor for the computer application, and allowing the user to launch the selected computer application having a credit depletion coefficient if the live credit personal value of the user is greater than the computer application credit depletion coefficient value set by the supervisor and removing the credit depletion value from the live credit personal value for each fixed time interval.

As shown, the method also includes the step of notifying the user of live credit personal value 1011 at each fixed time interval at the display. The method also includes the step of denying the user to launch also includes the step of notifying 1012, and 1013 the user of potential computer applications or other possible ways to generate credit to increase the live credit personal value. The notification of the user includes denying access to a second computer application launched 1010 if the live credit personal value is zero or below a credit depletion coefficient of the second computer application. Finally, the method includes the steps of allowing the supervisor to access the management application software layer, including the step of blocking the user 1014 from accessing the management application software layer.

Unillustrated is the step of setting an initial value for the live credit value personal to the user, including setting a value of zero, and there the fixed time interval is a number of minutes of use fixed by the supervisor in the management software layer, and wherein the credit generation coefficient and the credit depletion coefficients are proportional to the fixed-time interval.

What is also contemplated is the capacity of parents or supervisors to manually enter the interface layer by entering a password and adding or subtract credits from the live credit value as a reward or a punishment. For example, a child can be told only once homework is made to the satisfaction of the parent will 100 credits be added to the live credit value to give a child a total of 10 minutes of play with a game having a credit depletion coefficient of −10. While one possibility is described, what is contemplated is the capacity of the supervisor capacity to interact with the live credit value.

In yet another embodiment, the management application software layer will notify a supervisor each time a new software application is added in the device. This notification can be done upon entry by the supervisor into the software layer, or can be done by sending an email or a communication text to a designated phone number or email address. In the case of a subsequent download of a software application within the device, a default value (for example −1) for the credit coefficient will be assigned to the new application. In yet another embodiment, the layer can operate and provide a user with questions and offers that will generate credits to be added to the live credit value. For example, the management layer can be programmed, when the method denies the access to a software application for lack of live credit that upon answer of the following question, or upon launch of the following application, a bonus credit will be awarded.

It is understood that the preceding is merely a detailed description of some examples and embodiments of the present invention and that numerous changes to the disclosed embodiments may be made in accordance with the disclosure made herein without departing from the spirit or scope of the invention. The preceding description, therefore, is not meant to limit the scope of the invention but to provide sufficient disclosure to one of ordinary skill in the art to practice the invention without undue burden.

What is claimed is:

1. A preference-based management interface system, the system comprising:
    a portable device in possession of a user having at least a computer processing unit (CPU) for executing in a memory connected to the CPU a plurality of computer applications operating in a computer operating system environment, a display connected to the CPU for displaying at least one of the plurality of computer applications, and a user interface connected to the CPU for interaction with the at least one of the plurality of computer applications being displayed on the display;
    a management application software layer operating within the CPU; and
    a plurality of computer applications for individual consecutive execution in the CPU for use by the user of the portable device using the display and the user interface, wherein the management application software layer allows or denies access by the user to a requested computer application from the plurality of computer applications, wherein the allowance of access or the denial of access of the user to any requested computer application is based on a credit system with a live credit value personal to the user wishing to launch or use the requested computer application, and wherein the management application software layer allows a supervisor to associate a credit generation coefficient or a credit depletion coefficient to each of the plurality of computer applications,
    wherein the fixed time interval is a number of minutes of use fixed by the supervisor in the management software layer, and wherein the credit generation coefficient and the credit depletion coefficients are proportional to the fixed time interval, wherein the management application software layer at fixed time intervals incrementally updates the live credit value of the user based on either the credit generation coefficient or the credit depletion coefficient, and wherein the denial of access to the computer application is based on a positive live credit value, and wherein the fixed time interval is a range between one and five minutes of use, and the credit generation coefficient and the credit depletion coefficient are both numbers ranging from 1 to 10, and wherein different computer applications are each assigned a different and individual credit depletion coefficient or a credit generation coefficient.

2. The system of claim 1, wherein the portable device is selected from a group consisting of a tablet, a wireless phone, a web-enabled handheld device, or a portable computer.

3. The system of claim 1, wherein the management application software layer is an App uploaded via a network from an App store, and wherein at least one of the plurality of computer applications is an App uploaded by the user via the network from an App store.

4. The system of claim 1, wherein the supervisor association of the credit generation coefficient or the credit depletion coefficient to each of the plurality of computer applications is made by first accessing a list of computer applications and either not touching on the computer interface a selected computer application for keeping the coefficient to zero, swiping in a first direction to increment the credit generation coefficient positively, and swiping in a second direction to increment the credit depletion coefficient.

5. The system of claim 4, wherein color is used by the management software layer to help the supervisor to distinguish between a computer application given a credit generation coefficient and a computer application given a credit depletion coefficient.

6. A method of allowing a supervisor of a preference-based management interface system to motivate a user of multiple computer applications toward a greater use of some of the computer applications, the method comprising the steps of:
    allowing a user to upload into a portable device a plurality of computer applications, the portable device having at least a computer processing unit (CPU) for executing in a memory connected to the CPU a plurality of computer applications operating in a computer operating system environment, a display connected to the CPU for displaying at least one of the plurality of computer applications, and a user interface connected to the CPU for interaction with the at least one of the plurality of computer applications being displayed on the display, and a management application software layer operating within the CPU having a credit system with a live credit value personal to the user;
    allowing a supervisor to access the management application software layer on the portable device to recognize and list all of the computer applications in the device;
    allowing the supervisor to associate a credit generation coefficient or a credit depletion coefficient to each of the plurality of computer applications, and wherein the supervisor can associate a different individual credit depletion coefficient or a credit generation coefficient for each of the plurality of computer applications;
    setting an initial value for the live credit value personal to the user;
    assigning different credit generation coefficient or a credit depletion coefficient to discourage or encourage the user into some of the plurality of computer applications; and
    repeating steps of either:
    allowing the user to launch a selected computer application having a credit generation coefficient and incrementing at a fixed time interval the live credit personal value of the user based on the credit generation coefficient, or denying the user to launch the selected computer application having a credit depletion coefficient if the live credit personal value of the user is lower than the computer application credit depletion coefficient value set by the supervisor for the computer application, and allowing the user to launch the selected computer application having a credit depletion coefficient if the live credit personal value of the user is greater than the computer application credit depletion coefficient value set by the supervisor and removing the credit depletion value from the live credit personal value for each fixed time interval.

7. The method of claim 6, further comprising the steps of notifying the user of live credit personal value at each fixed time interval at the display.

8. The method of claim 7, wherein the step of denying the user to launch also includes the step of notifying the user of potential computer applications or other possible ways to generate credit to increase the live credit personal value.

9. The method of claim 8, wherein the notification of the user includes denying access to a second computer application launched if the live credit personal value is zero or below a credit depletion coefficient of the second computer application.

10. The method of claim 6, wherein the step of allowing the supervisor to access the management application software layer includes the step of blocking the user from accessing the management application software layer.

11. The method of claim 6, wherein the step of setting an initial value for the live credit value personal to the user, is setting a value of zero.

12. The method of claim 6, wherein the portable device is selected from a group consisting of a tablet, a wireless phone, a web-enabled handheld device, or a portable computer.

13. The method of claim 6, wherein the management application software layer is an App uploaded via a network from an App store, and wherein at least one of the plurality of computer applications is an App uploaded by the user via the network from an App store.

14. The method of claim 6, wherein the fixed time interval is a number of minutes of use fixed by the supervisor in the management software layer, and wherein the credit generation coefficient and the credit depletion coefficients are proportional to the fixed time interval.

15. The method of claim 6, further including the step of offering a user with the choice of answering trivia questions or performing any other activity to generate a bonus credit to the live credit value personal to the user.

* * * * *